(12) United States Patent
Oran

(10) Patent No.: US 6,968,313 B1
(45) Date of Patent: Nov. 22, 2005

(54) METHOD AND APPARATUS FOR FACILITATING AND TRACKING PERSONAL REFERRALS

(75) Inventor: Daniel P. Oran, Cambridge, MA (US)

(73) Assignee: H Three, Inc., Cambridge, MA (US)

( * ) Notice: Subject to any disclaimer, the term of this patent is extended or adjusted under 35 U.S.C. 154(b) by 0 days.

(21) Appl. No.: 09/441,191

(22) Filed: Nov. 15, 1999

(51) Int. Cl.[7] .............................................. G06F 17/60
(52) U.S. Cl. ................... 705/9; 705/26; 707/1
(58) Field of Search ........................... 705/27, 26, 10, 705/14, 1, 9; 707/1, 5

(56) References Cited

U.S. PATENT DOCUMENTS

| | | | |
|---|---|---|---|
| 5,164,897 A | 11/1992 | Clark et al. | 364/401 |
| 5,758,324 A | 5/1998 | Hartman et al. | 705/1 |
| 5,832,497 A | 11/1998 | Taylor | 707/104 |
| 5,884,270 A | 3/1999 | Walker et al. | 705/1 |
| 5,884,272 A | 3/1999 | Walker et al. | 705/1 |
| 5,892,909 A | 4/1999 | Grasso et al. | 395/200.31 |
| 5,923,845 A | 7/1999 | Kamiya et al. | 395/200.36 |
| 5,978,768 A | 11/1999 | McGovern et al. | 705/1 |
| 5,987,440 A | 11/1999 | O'Neil et al. | 705/44 |
| 5,991,740 A | 11/1999 | Messer | 705/27 |
| 5,999,929 A | 12/1999 | Goodman | 707/7 |
| 6,012,083 A | 1/2000 | Savitzky et al. | 709/202 |
| 6,016,504 A | 1/2000 | Arnold et al. | 709/200 |
| 6,026,368 A | 2/2000 | Brown et al. | 705/14 |
| 6,029,141 A | 2/2000 | Bezos et al. | 705/27 |
| 6,049,777 A | 4/2000 | Sheena et al. | 705/10 |
| 6,058,435 A | 5/2000 | Sassin et al. | 709/305 |
| 6,064,980 A | 5/2000 | Jacobi et al. | 705/26 |
| 6,073,138 A | 6/2000 | de l'Etraz et al. | 707/104 |
| 6,073,167 A * | 6/2000 | Poulton et al. | 709/206 |
| 6,457,005 B1 * | 9/2002 | Torrey | 707/5 |
| 2001/0047347 A1 * | 11/2001 | Perell et al. | 707/1 |

FOREIGN PATENT DOCUMENTS

WO    WO 9312489 A1 *  6/1993

OTHER PUBLICATIONS

Microsoft Press Computer Dictionary, Third Ed., definition of "e-mail" (Redmond WA: Microsoft Press, 1997): 173.*
"Anything Internet's AnythingPC unit launches new affiliates program", Business Wire, p. 0111, Jul. 2, 1999.*
Tobias, Arthur J., "Co-op programs a good deal all around", Electronic Engineering Times, n. 921, pp. 142, 158+, Sep. 30, 1996.*

* cited by examiner

Primary Examiner—Donald L. Champagne
(74) Attorney, Agent, or Firm—Foley Hoag, LLP

(57) ABSTRACT

The present invention facilitates and tracks personal referrals made via electronic networks. In a preferred embodiment, using electronic mail delivered to a participant interface 110, a central controller 100 provides a Web page through which an individual may enter the electronic-mail addresses of those whom he or she wishes to refer. This spares the individual the inconvenience of generating his or her own electronic-mail referrals, and also enables the central controller to determine the format and tone of the referral. The address or contents of the Web page includes a unique identifier that is exclusively associated with that individual and a specific offer 120. In this way, the series of referrals may be tracked, duplicate referrals to the same electronic-mail address may be eliminated, offers may be withdrawn or modified, and referrals about an expired or withdrawn offer may be prevented.

12 Claims, 5 Drawing Sheets

METHOD AND APPARATUS FOR FACILITATING AND TRACKING PERSONAL REFERRALS

FIELD OF THE INVENTION

The present invention relates to the use of electronic networks for personal referrals.

BACKGROUND OF THE INVENTION

Word of mouth is a crucial factor in the success of many ventures, including the promotion of books, the sale of real estate, and the identification of job candidates. An appealing product or an interesting opportunity appears, and one person tells another, who tells another, who tells another. Such a series of personal referrals can quickly disseminate news about a product or an opportunity to a wide audience.

The Internet makes it possible for such personal referrals to reach a significantly wider audience. Unlike other communication media, the Internet presents no physical or financial barriers to personal referrals across vast distances. For example, the cost of sending electronic mail from New York to Boston is the same as the cost of sending electronic mail from New York to Tokyo. In contrast, sending postal mail or making a telephone call across the Pacific is significantly more expensive than doing so within the United States. And a face-to-face personal referral from New York to Tokyo obviously requires the purchase of a costly airplane ticket.

Although personal referrals via the Internet reach a wider audience than those made via other communication media, there are at least six fundamental limitations on the effectiveness of such referrals as a marketing method: (1) as a referral reaches each additional person, the continuation of the series depends on that person taking the initiative to contact someone else; (2) even if the series of referrals continues unabated, the marketer has no reliable means of identifying individuals who often make an above average number of referrals, or whose referrals often lead to successful outcomes for the marketer; (3) there is the possibility that an individual will receive the same referral from multiple parties, causing annoyance and ill will; (4) there is no way to control the manner in which each additional person in the series is contacted, i.e., the content and tone of the referral is left entirely to the individual; (5) after an offer has been modified, there is no way to prevent further referrals regarding the original version of the offer or to ensure that the latest version of the offer is always presented; and (6) after an offer has expired or has been withdrawn, there is no way to prevent further referrals regarding it.

OBJECTS AND ADVANTAGES

Accordingly, several objects and advantages of the present invention are:
(a) to minimize the effort required to make a referral;
(b) to allow the marketer to track and to analyze the pattern of referrals;
(c) to reduce the chance that an individual will receive the same referral from multiple parties;
(d) to control the content and tone of referrals;
(e) to prevent further referrals about an earlier version of an offer;
(f) to ensure that the latest version of an offer is always presented; and
(g) to prevent further referrals after an offer has expired or has been withdrawn.

Further objects and advantages of the present invention will become apparent from a consideration of the following drawings and description.

BRIEF SUMMARY OF THE INVENTION

The present invention facilitates and tracks personal referrals made via electronic networks. In a preferred embodiment, using electronic mail delivered to a participant interface, a central controller provides a Web page through which an individual may enter the electronic-mail addresses of those whom he or she wishes to refer. This spares the individual the inconvenience of generating his or her own electronic-mail referrals, and also enables the central controller to determine the format and tone of the referral. The address or contents of the Web page includes a unique identifier that is exclusively associated with that individual and a specific offer. In this way, the series of referrals may be tracked, duplicate referrals to the same electronic-mail address may be eliminated, offers may be withdrawn or modified, and referrals about an expired or withdrawn offer may be prevented.

DETAILED DESCRIPTION OF THE INVENTION

Figure 1:
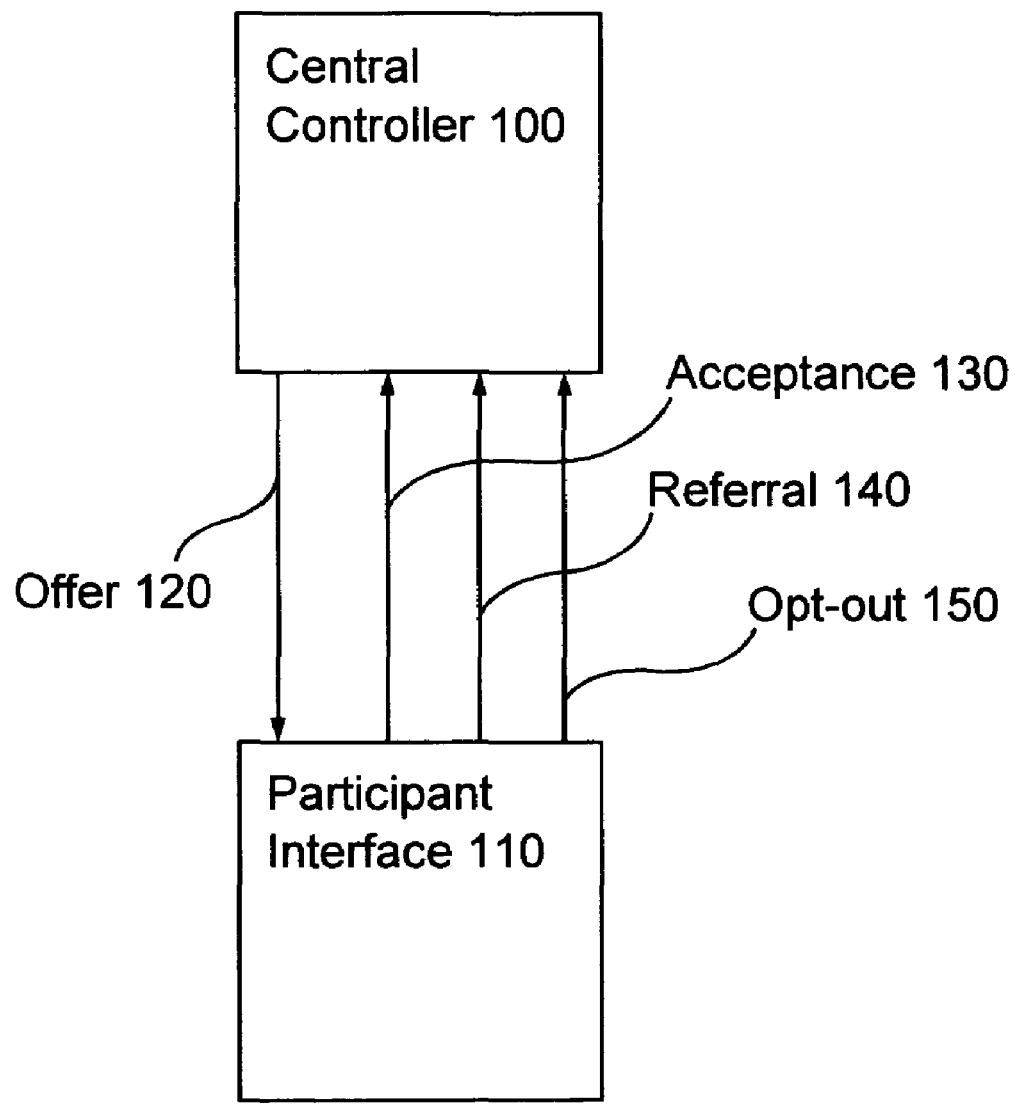
FIG. 1 illustrates one embodiment of the present invention.
Figure 2:
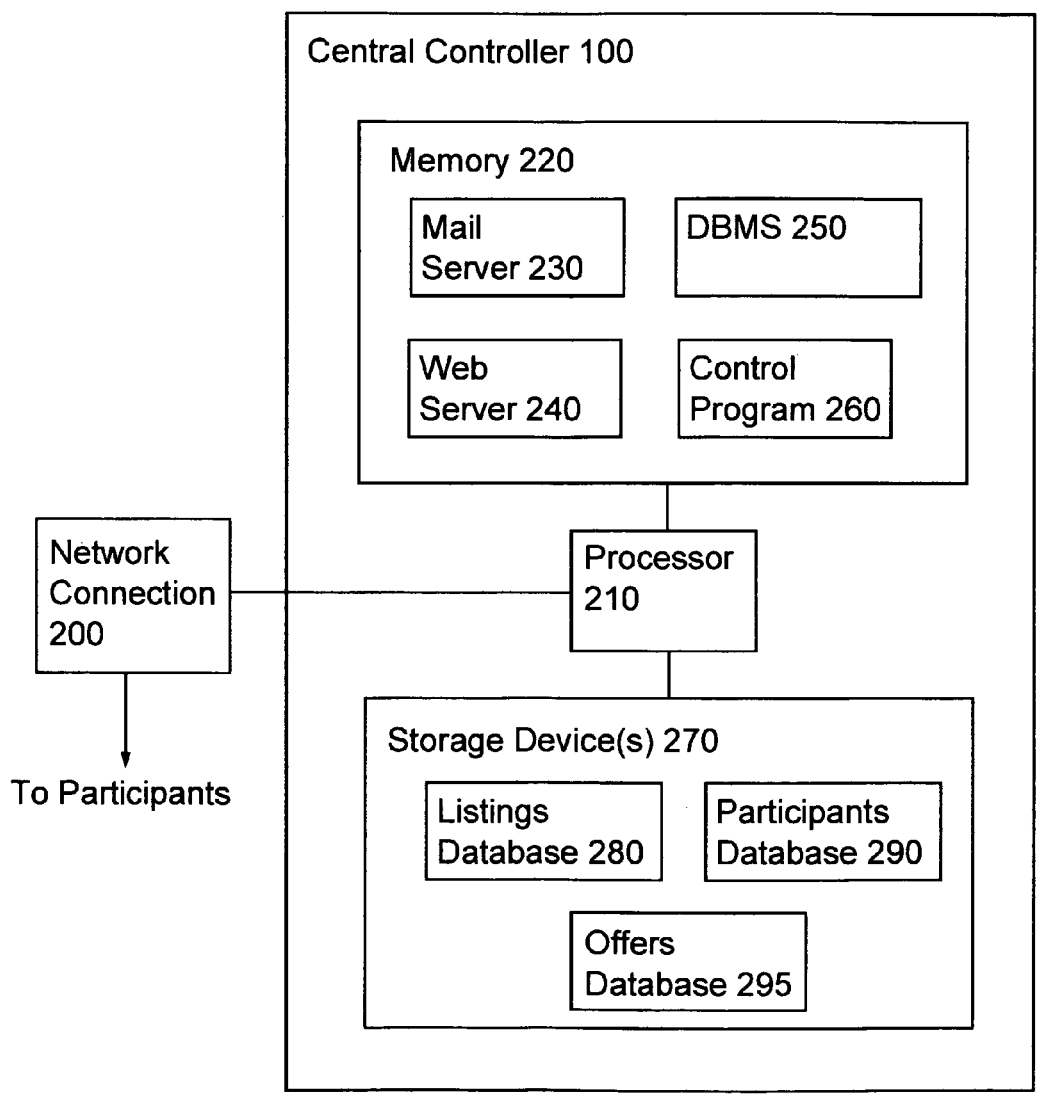
FIG. 2 is a block diagram showing one embodiment of the central controller.
Figure 3:
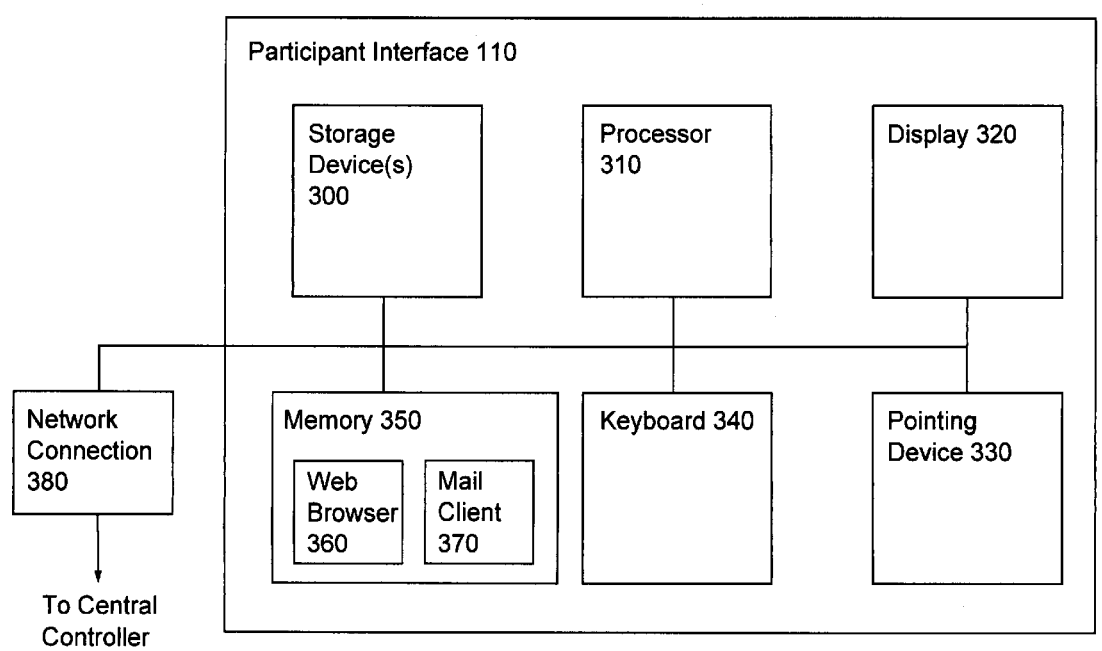
FIG. 3 is a block diagram showing one embodiment of the participant interface.

FIGS. 1 through 3 illustrate the system architecture of one embodiment of the present invention. As shown in FIG. 1, the apparatus of the present invention comprises a central controller 100 and a participant interface 110. Via electronic mail, an offer 120 is transmitted from the central controller 100 to the participant interface 110. By interacting with a Web page delivered in the electronic mail or by visiting a Web page referenced by a hyperlink included in the electronic mail, the user of the participant interface may indicate his or her acceptance 130 of the offer 120 and/or make a referral 140 of other possible recipients of the offer 120. Alternatively, the user may choose to opt out 150, indicating he or she prefers not to receive (1) any further offers 120, (2) any further offers 120 in this particular category of items, or (3) any further offers 120 that are due to a referral 140 from a specific individual.

For the sake of clarity, just one central controller 100 is depicted in the FIG. 1, but those skilled in the art will appreciate that many such devices may be included in an embodiment of the present invention in order to simultaneously process a large number of transactions. Similarly, although just one participant interface 110 is depicted in FIG. 1, an unlimited number of such devices may be connected to the central controller 100 via a network, an example of which is the Internet.

FIG. 2 is a block diagram of a computer system that is capable of serving as central controller 100. This system includes a network connection 200, a processor 210, memory 220, and one or more storage devices 270. Stored in memory 220 are software programs for (1) sending and receiving electronic mail (mail server 230), (2) creating and sending requested Web pages (Web server 240), (3) managing the flow of information into and out of databases (database management software, or DBMS 250), and (4) directing the overall activities of the central controller (control program 260). Storage devices 270 contain (1) a listings database 280, which includes items about which offers are tendered, (2) a participants database 290, which includes individuals to whom offers are tendered, and (3) an offers database 295, which records the offers made to participants about specific listings. Those skilled in the art will recognize that the central controller 100 may be implemented on any computer system capable of carrying out the central controller's required functions. In addition, those skilled in the art will appreciate that the information stored in the listings database 280, participants database 290, and offers database 295 may be stored in a lesser or greater number of databases. Similarly, those skilled in the art will appreciate that a lesser or greater number of software programs may be employed to carry out the functions of the mail server 230, Web server 240, DBMS 250, and control program 260.

FIG. 3 is a block diagram of a computer system that is capable of serving as the participant interface 110. The system includes one or more storage devices 300, a processor 310, a display 320, a pointing device 330, a keyboard 340, memory 350, and a network connection 380. Stored in memory 350 are software programs for (1) requesting and displaying Web pages (Web browser 360) and (2) sending and receiving electronic mail (mail client 370). Those skilled in the art will recognize that the participant interface 110 may be implemented on any computer system capable of carrying out the participant interface's functions.

Figure 4:
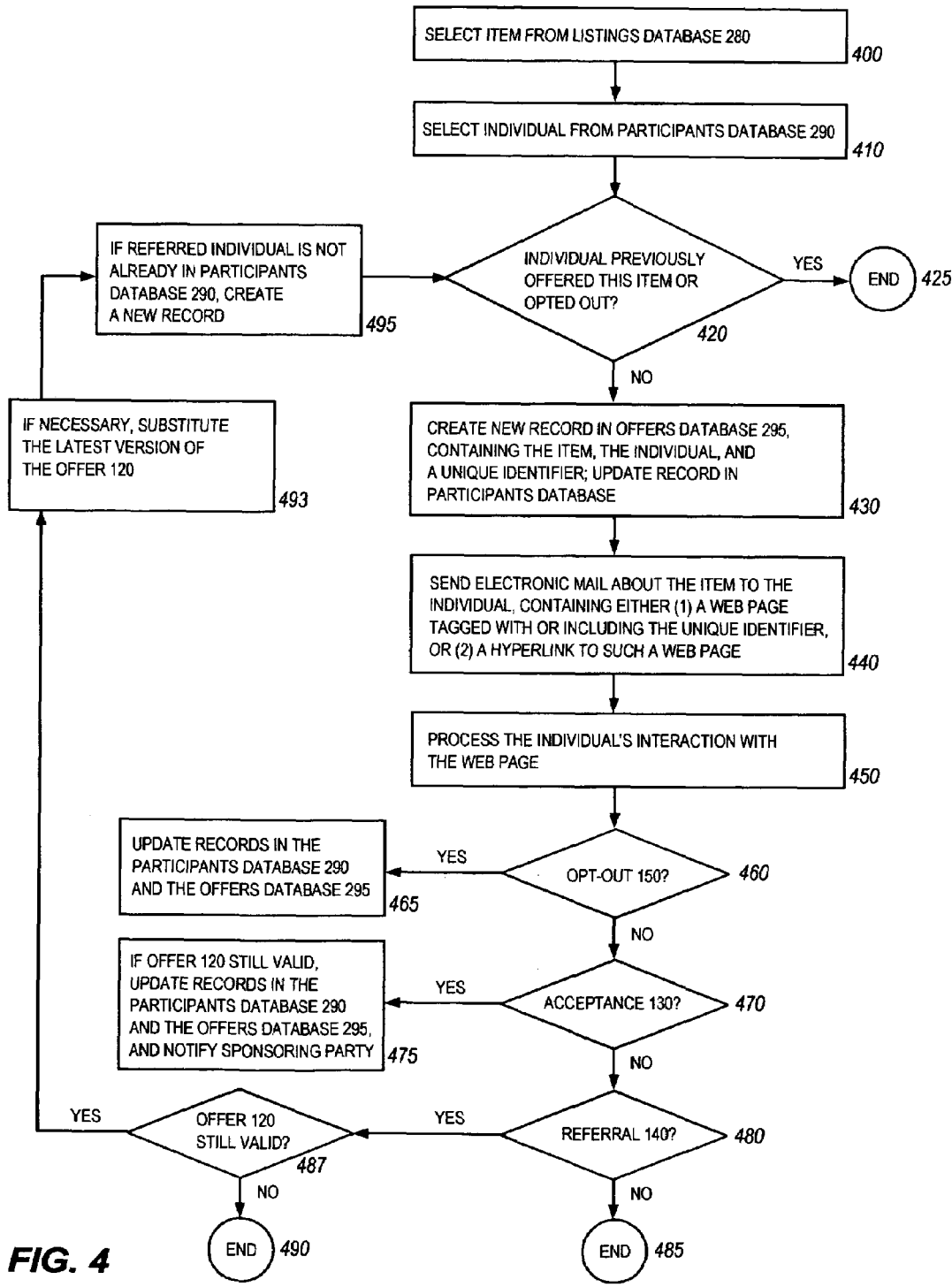
FIG. 4 is a flow chart illustrating one embodiment of the central controller.
Figure 5:
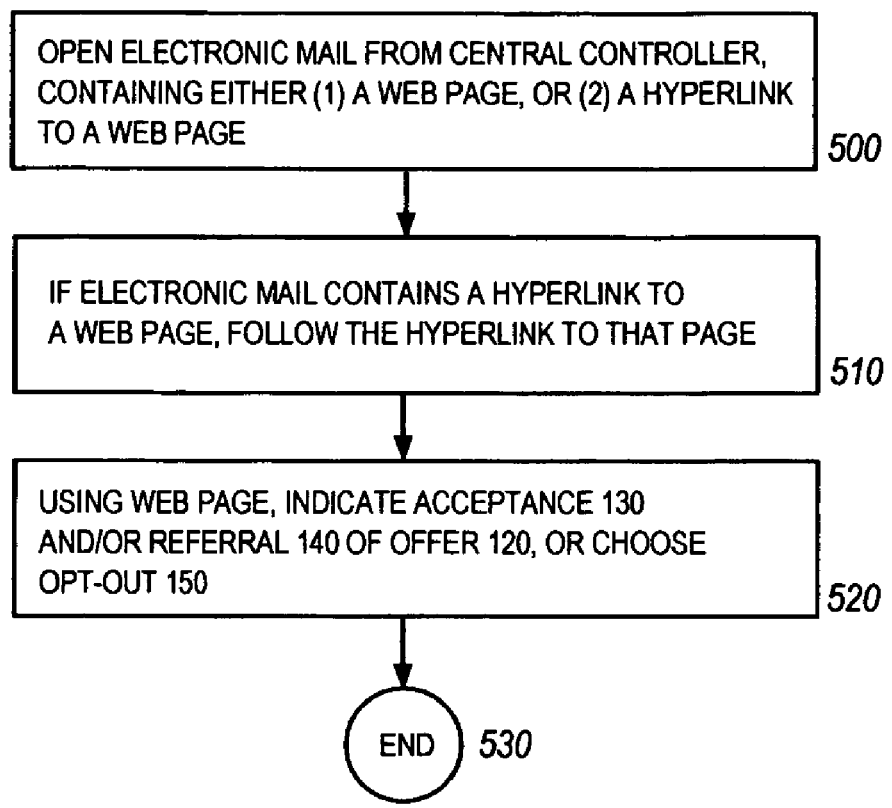
FIG. 5 is a flow chart illustrating one embodiment of the participant interface.

FIGS. 4 and 5 illustrate the steps performed by embodiments of the central controller 100 and the participant interface 110 in the present invention. As depicted in FIG. 4, at step 400, the central controller 100 begins by selecting an item from the listings database 280. For example, the item might be a job description or a house for sale. At step 410, the central controller 100 selects an individual from the participants database 290. At step 420, central controller 100 examines the individual's record in the participants database 290. If the individual has previously received an offer 120 regarding this item or opted out, the central controller 100 ends the process at step 425. Otherwise, the central controller 100 continues to step 430, in which it updates the record in the participants database 290 to reflect the selection of the individual for this offer. It also creates a new record in the offers database 295, containing the item, the individual, and a unique identifier. For example, the unique identifier might be the individual's electronic-mail address paired with an item number, or an alphanumeric sequence, defined arbitrarily or systematically, that is assigned only to the pairing of that individual and that item.

At step 440, the central controller 100 sends electronic mail about the item to the individual at the participant interface 110. The message contains either (1) a Web page tagged with or including the unique identifier, or (2) a hyperlink to such a Web page. In interacting with the Web page at step 450, the individual may choose one, all, or none of the following responses: (1) opt-out 150, (2) acceptance 130, or (3) referral 140. For example, in the case of a job description, the individual may choose to accept the invitation to apply, and, at the same time, also refer several friends for the same job.

At step 460, if the individual chooses to opt out, the central controller 100, at step 465, updates the relevant records in the participants database 290 and the offers database 295 to reflect this choice. At step 470, if the individual choose to accept the offer 120, the central controller 100, at step 475, first determines whether the offer 120 is still valid. If the offer 120 is still valid, the central controller 120 updates the relevant records in the participants database 290 and the offers database 295 to reflect this choice, and also notifies the sponsoring party. For example, in the case of a job description, the central controller 100 might send electronic mail to the prospective employer.

At step 480, if the individual chooses to refer one or more people, the central controller 100 first determines, at step 487, whether the offer 120 is still valid. If the offer 120 is still valid, the central controller 100, at step 493, substitutes the latest version of the offer. Next, at step 495, the central controller 100 creates new records in the participants database 290 for the referred people, if they are not already included in it. For each of the referred people, the central controller then loops back to step 420, first determining whether he or she has previously received an offer 120 for this item or opted out. In the case of a previous offer 120 or opt-out 150, the central controller ends the process at step 425. Otherwise, the process continues on as described earlier, beginning with step 430.

As depicted in FIG. 5, from the perspective of the individual at the participant interface 110, the process begins at step 500, by opening electronic mail from the central controller 100. This electronic mail contains either a Web page or a hyperlink to such a Web page. If the electronic mail contains a hyperlink to a Web page, then the individual follows the hyperlink to that page at step 510. At step 520, by interacting with the Web page, the individual indicates his or her response to the offer 120, as described earlier.

While the present invention has been described in terms of specific embodiments thereof, those skilled in the art will appreciate that various changes in form and detail may be made without departing from the intended spirit and scope of the invention as defined in the following claims.

I claim:

1. A method for tracking personal referrals related to an employment offer, the method comprising:
   generating a unique identifier that is associated exclusively with the pairing of an individual and the employment offer;
   sending to said individual an electronic-mail message that provides a hyperlink to or contains a Web page whose address or contents includes said unique identifier or a transformation thereof;
   providing in said Web page a means to allow the individual to provide the electronic-mail (email) address of persons to whom said individual wishes to refer the employment opportunity;
   tracking the referral by:
   receiving from said individual the email addresses for the persons to whom said individual referred,
   updating at least one database to associate the individual with the electronic-mail addresses of the persons whom the individual wishes to refer, and
   for each electronic-mail address of persons whom said individual wishes to refer, returning to generating a unique identifier.

2. The method of claim 1 wherein said unique identifier or a transformation thereof is included in a uniform resource locator.

3. The method of claim 1, where sending includes:
determining whether said individual has previously been sent an electronic-mail message about said offer, and,
sending when said individual has not previously been sent an electronic message about said offer.

4. The method of claim 1, where sending includes:
determining whether said individual has previously opted out of receiving all such electronic-mail messages, and,
sending when said individual has not previously opted out of receiving such electronic-mail messages.

5. The method of claim 1, where sending includes:
determining whether said individual has previously opted out of receiving electronic-mail messages pertaining to said offer, and,
sending when said individual has not previously opted out of receiving electronic-mail messages pertaining to said offer.

6. The method of claim 1, where sending includes:
determining the party whose referral caused said offer to be made to said individual and whether said individual has previously opted out of receiving electronic-mail messages pertaining to offers referred by said party.

7. The method of claim 1, further comprising:
providing in said Web page a means of accepting said offer.

8. The method of claim 7, further comprising:
notifying the sponsor of said offer in case of an acceptance by said individual.

9. The method of claim 1, further comprising:
providing in said Web page a means of opting out of receiving electronic-mail messages pertaining to one or more categories of such offers.

10. The method of claim 1, further comprising:
providing in said Web page a means of opting out of receiving electronic-mail messages pertaining to offers referred by the party whose referral caused said offer to be made to said individual.

11. The method of claim 1, where sending includes:
determining whether said offer is still valid, and
sending the latest version of said offer if a new version is available.

12. The method of claim 1, further comprising:
providing in said Web page a means of opting out of receiving all such electronic-mail messages.

\* \* \* \* \*